(12) United States Patent
Okabe et al.

(10) Patent No.: US 11,724,586 B2
(45) Date of Patent: Aug. 15, 2023

(54) WORK VEHICLE

(71) Applicant: Kubota Corporation, Osaka (JP)

(72) Inventors: Kensuke Okabe, Sakai (JP); Kohta Nakao, Sakai (JP); Kazuhiro Tanaka, Sakai (JP); Yusuke Endo, Sakai (JP); Toshifumi Yasuda, Sakai (JP)

(73) Assignee: Kubota Corporation, Osaka (JP)

( * ) Notice: Subject to any disclaimer, the term of this patent is extended or adjusted under 35 U.S.C. 154(b) by 6 days.

(21) Appl. No.: 17/319,572

(22) Filed: May 13, 2021

(65) Prior Publication Data
US 2022/0105794 A1 Apr. 7, 2022

(30) Foreign Application Priority Data

Oct. 5, 2020 (JP) .................. 2020-168552
Oct. 5, 2020 (JP) .................. 2020-168553

(51) Int. Cl.
*B60K 11/04* (2006.01)
*B60K 13/04* (2006.01)
*B60K 17/00* (2006.01)

(52) U.S. Cl.
CPC .............. *B60K 11/04* (2013.01); *B60K 13/04* (2013.01); *B60K 17/00* (2013.01)

(58) Field of Classification Search
CPC ......... B60K 11/02; B60K 11/04; B60K 11/08; B60K 13/04; B60K 17/00; B60Y 2400/72; B60Y 2200/20
See application file for complete search history.

(56) References Cited

U.S. PATENT DOCUMENTS

| 5,285,863 | A | * | 2/1994 | Miki | ................... | B66F 9/07595 |
| | | | | | | 180/68.2 |
| 2009/0103838 | A1 | * | 4/2009 | Fonkalsrud | ...... | B60K 15/03177 |
| | | | | | | 383/127 |
| 2014/0023473 | A1 | * | 1/2014 | Kobayashi | ............ | E02F 9/0858 |
| | | | | | | 414/687 |
| 2017/0254280 | A1 | | 9/2017 | Honjo et al. | | |
| 2019/0061450 | A1 | * | 2/2019 | Hayashi | ................... | B60G 3/18 |
| 2019/0359417 | A1 | * | 11/2019 | D'Alessandro | ........... | B60S 1/66 |
| 2021/0062909 | A1 | * | 3/2021 | Sheidler | ............. | F16H 57/0436 |

FOREIGN PATENT DOCUMENTS

| JP | 2014118126 A | 6/2014 |
| JP | 2017155698 A | 9/2017 |
| WO | WO-2009051676 A1 * | 4/2009 ....... B60K 15/03177 |

\* cited by examiner

*Primary Examiner* — Grant Moubry
*Assistant Examiner* — James G Moubry
(74) *Attorney, Agent, or Firm* — The Webb Law Firm

(57) ABSTRACT

A work vehicle includes an engine (11); a traveling device (1, 2) capable of traveling on the ground; a power transmission device (13) that transmits driving power of the engine (11) to the traveling device (1, 2) with a work oil; a cooling device (15) for cooling the engine (11) with a cooling fluid; a storage unit (17) having a first storage space (17A) for storing the work oil and a second storage space (17B) for storing the cooling fluid.

14 Claims, 7 Drawing Sheets

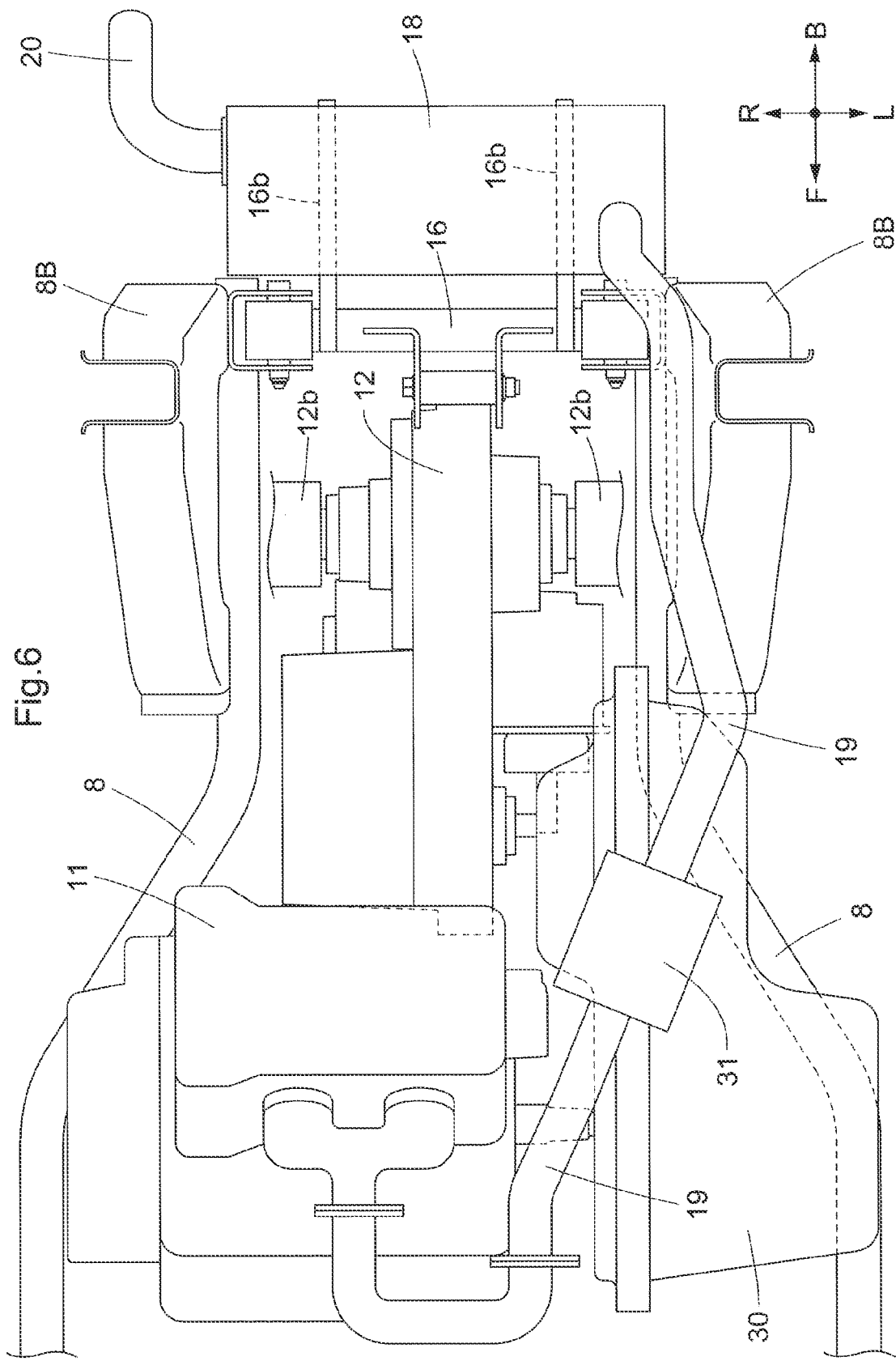

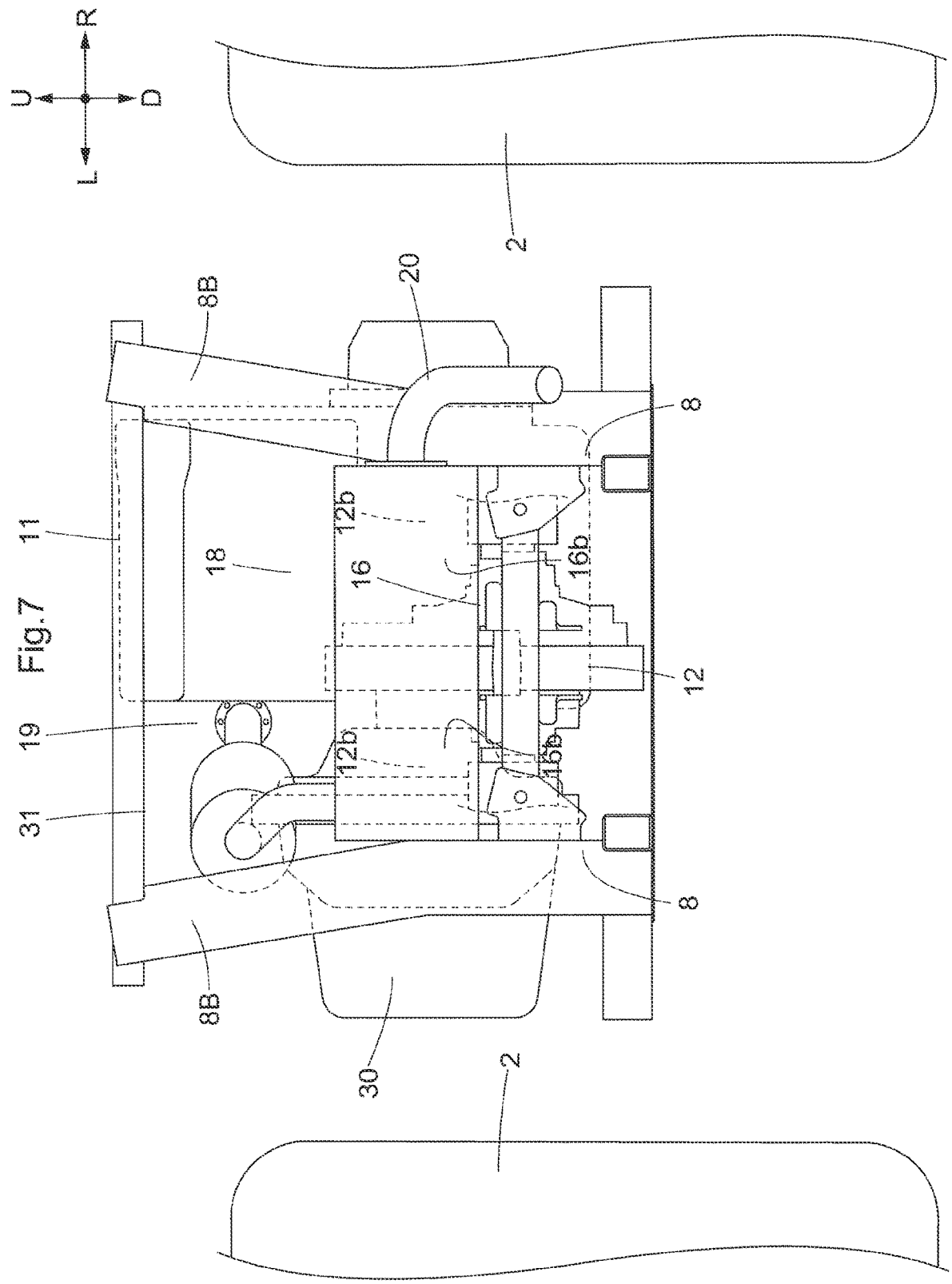

WORK VEHICLE

CROSS-REFERENCE TO RELATED APPLICATIONS

This application claims priority to Japanese Patent Application Nos. 2020-168552 filed Oct. 5, 2020, and 2020-168553 filed Oct. 5, 2020, the disclosures of which are hereby incorporated by reference in their entirety.

BACKGROUND OF THE INVENTION

Description of Related Art

For example, a work vehicle disclosed in Japanese Unexamined Patent Application Publication No. JP2014-118126A ("multipurpose vehicle" in the patent literature) is provided with a power transmission device ("stepless speed-changing device" in the literature) that uses a work oil to transmit driving force of an engine to a traveling device ("front wheel" and "rear wheel" in the literature). The work oil is used to operate the power transmission device, and the work oil is cooled by an oil cooler. In order to increase an operating efficiency of the power transmission device, it is important that a viscosity and a temperature of the work oil are properly adjusted. However, in a so-called cold start state, the temperature of the work oil is low, and warm-up operation is performed to raise the temperature of the work oil while the power transmission device is operating under low load in actual vehicle driving. At a warm-up operation stage, the power transmission device operates at a low operating efficiency. For this reason, it is desirable that the temperature of the work oil rise to an optimum temperature from the cold start state as quickly as possible. In addition, when the work oil flows through the oil cooler, flow path resistance is generated inside the oil cooler. Therefore, if the oil cooler is provided in a hydraulic circuit of the work oil, the operating efficiency of the power transmission device is reduced by an amount of the pressure loss when the work oil flows through the oil cooler. Therefore, there is room for improvement from the viewpoint of achieving both the operating efficiency of the power transmission device and a cooling efficiency of the work oil. An object of the present invention is to provide a work vehicle in which the work oil can be efficiently cooled while the operating efficiency of the power transmission device is increased.

For example, the work vehicle disclosed in Japanese Unexamined Patent Application Publication No. JP2017-155698A ("multipurpose vehicle" in the patent literature) is provided with the power transmission device ("belt-type stepless speed-changing device" in the literature) that transmits driving power of the engine to the traveling device ("front wheel" and "rear wheel" in the literature). In addition, in this work vehicle, an exhaust muffler is connected to the engine, and the exhaust muffler is disposed in a state of being extending in the front-rear direction of a vehicle body (see FIG. 2). The power transmission device and the exhaust muffler are supported by a vehicle body frame. In the work vehicle disclosed in JP2017-155698A, the belt-type stepless speed-changing device is used as the power transmission device, but when a hydrostatic stepless speed-changing device is used as the power transmission device, a storage unit for storing the work oil of the hydrostatic stepless speed-changing device is required. For this reason, a layout of peripheral devices of engines and power speed-changing devices differ greatly between the case where the power transmission device is the belt-type stepless speed-changing device and the case where the power transmission device is the hydrostatic stepless speed-changing device, but even when the layout of the peripheral devices differs, it is desirable that the peripheral devices can be disposed as easily as possible. It is desirable to be able to place the peripheral devices as easily as possible even when the layout of the peripheral devices is different. An object of the present invention is to provide a work vehicle in which the layout of peripheral devices can be easily changed.

SUMMARY OF THE INVENTION

The work vehicle comprises:
an engine;
a traveling device capable of traveling on the ground; and
a power transmission device that transmits driving power of the engine to the traveling device with a work oil;
a cooling device for cooling the engine with a cooling fluid; and
a storage unit having a first storage space for storing the work oil and a second storage space for storing the cooling fluid.

According to the present invention, the first storage space and the second storage space are provided in the storage unit, and the cooling fluid is stored in the second storage space. Since the cooling fluid is used to cool the engine, when the engine is started from a cold start state, the cooling fluid stored in the second storage space circulates to cool the engine even if the vehicle is not actually traveling, and the temperature of the cooling fluid rises. The heat of the cooling fluid then conducts from the second storage space to the first storage space, and the work oil is heated by the cooling fluid. As a result, the temperature of the work oil rises rapidly from the cold start state as compared with a configuration in which the heat of the cooling fluid does not conduct to the work oil. When the temperature of the work oil rises higher than the temperature of the cooling fluid, the heat of the work oil conducts from the first storage space to the second storage space, and the work oil is cooled by the cooling fluid. Therefore, the cooling fluid acts as a heat medium for the work oil, and even if a dedicated oil cooler is not provided in the hydraulic circuit of the work oil, it can be configured that the temperature of the work oil is adjusted to the optimum temperature. For this reason, it becomes no longer necessary to provide a dedicated oil cooler in the hydraulic circuit, and the operating efficiency of the power transmission device to which the work oil is loaded can be improved. With this, a work vehicle is realized in which the work oil can be efficiently cooled while the operating efficiency of the power transmission unit is improved.

The work vehicle of the present invention further comprises:
a first partition wall provided in the storage unit and partitioning between the first storage space and the second storage space.

According to this configuration, the first partition wall is interposed between the first storage space and the second storage space, and the first storage space and the second storage space are disposed next to each other. Therefore, the first partition wall acts as a thermal bridge between the work oil in the first storage space and the cooling fluid in the second storage space. This facilitates heat exchange between the work oil and the cooling fluid.

In the work vehicle of the present invention, the first partition wall is constituted of a stainless steel member.

With this configuration, since the first partition wall is constituted of the stainless steel member, corrosion of the first partition wall becomes less likely to occur even if the first partition wall is in constant contact with the work oil or the cooling fluid, and durability of the first partition wall is improved.

The work vehicle of the present invention further comprises:

a supply pipe that supplies the work oil from the storage unit to the power transmission device and supplies the cooling fluid from the storage unit to the engine, wherein a second partition wall is provided in a pipeline of the supply pipe to divide the pipeline of the supply pipe into a plurality of pipelines, and a first supply pipeline connecting between the first storage space and the power transmission device, and a second supply pipeline connecting between the second storage space and the engine are formed by the second partition wall.

According to this configuration, the second partition wall is interposed between the first supply pipe and the second supply pipe, and the first supply pipe and the second supply pipe are disposed next to each other. Therefore, the second partition wall acts as a thermal bridge between the work oil in the first supply pipe and the cooling fluid in the second supply pipe. This facilitates heat exchange between the work oil and the cooling fluid.

The work vehicle of the present invention further comprises:

a guide part provided on a lateral outer side of a vehicle body and capable of guiding airflow from a front side to a lateral inner side of the vehicle body, wherein the guide part is disposed at a front side of the vehicle body and at the lateral outer side of the vehicle body relative to the storage unit.

When the vehicle is actually traveling forward, airflow from the front side acts on the vehicle body as a traveling wind. With this configuration, the traveling wind on the lateral outer side of the vehicle body is taken into the lateral inner side of the vehicle body by the guide part, and the traveling wind blows on the storage unit disposed on a rear side of the guide part. As a result, even if the temperature of the work oil tends to rise when the vehicle is actually traveling forward, the traveling wind cools the storage unit and the work oil stored inside the storage unit.

The work vehicle of the present invention comprises:
a vehicle body frame;
a traveling device capable of traveling on the ground;
an engine supported by the vehicle body frame;
an exhaust muffler connected to the engine; and
a power transmission device that transmits driving power of the engine to the traveling device;
wherein the vehicle body frame is provided with a support portion that supports either the exhaust muffler or a storage unit that stores a work oil of the power transmission device; and
wherein the support portion has a shape compatible with the exhaust muffler and the storage unit so as to be able to support any of the exhaust muffler and the storage unit.

According to the present invention, the support portion of the vehicle body frame has a shape compatible with the exhaust muffler and the storage portion. This makes it possible to configure the support portion to support the storage unit when the power transmission device requires the work oil, and to support the exhaust muffler when the power transmission device does not require the work oil. This makes it easy to change the layout of peripheral devices of engines and power transmission devices. With this, a work vehicle in which the layout of peripheral devices can be easily changed is realized.

In the work vehicle of the present invention, the exhaust muffler and the storage unit are supported by the support portion in a state where a central region in a longitudinal direction is located in the central region of the vehicle body frame in a lateral direction of the vehicle body at a time of being supported by the support portion.

With this configuration, the exhaust muffler or the storage unit is supported by the support portion in a state where the central area in the longitudinal direction of the exhaust muffler or the storage unit is located in the central area of the vehicle body frame in the lateral direction of the vehicle body. Therefore, for example, even if the work oil is stored in the storage unit and a weight of the storage unit becomes heavy, a weight balance of the left side and right side of the vehicle body becomes stable in a case where the storage unit is supported by the support portion.

In the work vehicle of the present invention,
the support portion is located at the rear end portion of the vehicle body frame; and
the exhaust muffler and the storage unit are supported by the support portion in a state in which the longitudinal direction is along the lateral direction of the vehicle body at the time of being supported by the support portion.

With this configuration, it is easy for an operator to work on the exhaust muffler or storage unit supported by the support section, from a rear portion of the vehicle body. Further, in a state where the exhaust muffler or the storage unit is supported by the support portion, the longitudinal direction of the exhaust muffler or the storage unit is along the lateral direction of the vehicle body. Therefore, as compared with a configuration in which the longitudinal direction is along the front-rear direction of the vehicle body, the exhaust muffler or the storage unit in a state of being supported by the support portion becomes less likely to protrude rearward relative to the rear end portion of the vehicle body frame.

The work vehicle of the present invention further comprises an exhaust gas purification device provided in an exhaust path between the engine and the exhaust muffler;
wherein the exhaust muffler is supported by the support portion; and
the exhaust gas purification device is disposed on a side where the engine is located, relative to the exhaust muffler.

In general, the exhaust gas purification device is subject to high temperatures, so countermeasures against heat are necessary around the exhaust gas purification device. In this configuration, the exhaust muffler and the exhaust gas purification device are configured as separate bodies, and the exhaust gas purification device is located on the side where the engine is located, relative to the exhaust muffler, so that it is easy to prevent the temperature of the exhaust muffler from becoming high.

In the work vehicle of the present invention,
the storage unit is supported by the support section; and
the exhaust muffler is disposed on the lateral side of the vehicle body of the engine in a plan view and on the side where the engine is located, relative to the storage unit.

Also, in the work vehicle of the present invention,
a discharge port that exhaust gas from the engine is provided in the exhaust path on a rear side relative to the exhaust muffler; and the discharge port is located in an upper region of the storage unit.

With this configuration, an efficient layout of the storage unit and the exhaust muffler is realized, and the overall layout of the equipment around the engine and the power transmission device is made compact.

BRIEF DESCRIPTION OF THE DRAWINGS

FIG. 6 is a main-part plane view showing the engine, the transmission device, the exhaust muffler, and an exhaust gas purification device of the multipurpose vehicle in a case where a storage tank is not provided.

FIG. 7 is a rear view showing the rear portion of the multipurpose vehicle in a case where the storage tank is not provided.

DETAILED DESCRIPTION OF PREFERRED EMBODIMENTS

Figure 1:
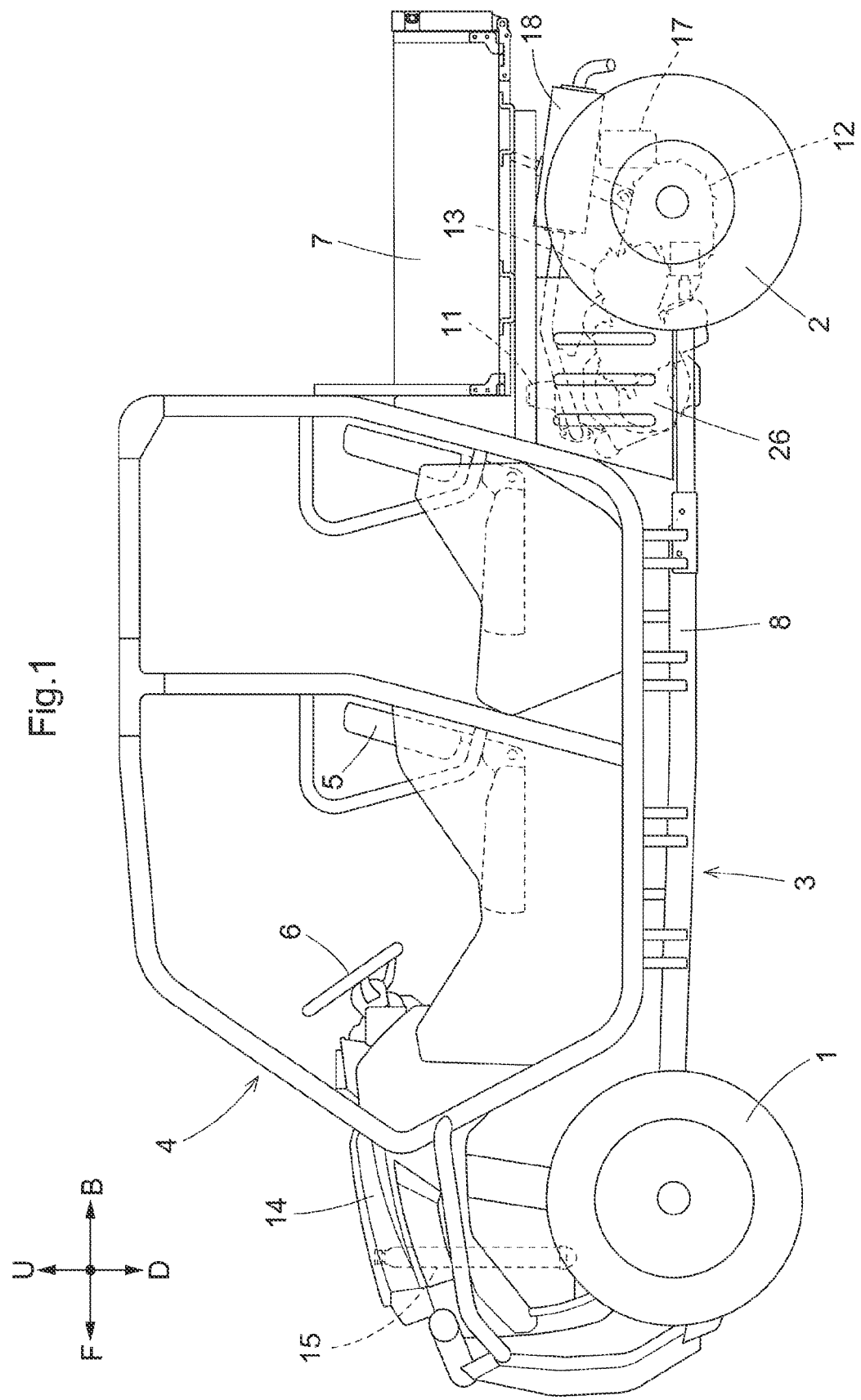
FIG. 1 is a left side view of a multipurpose vehicle as a whole.
Figure 2:
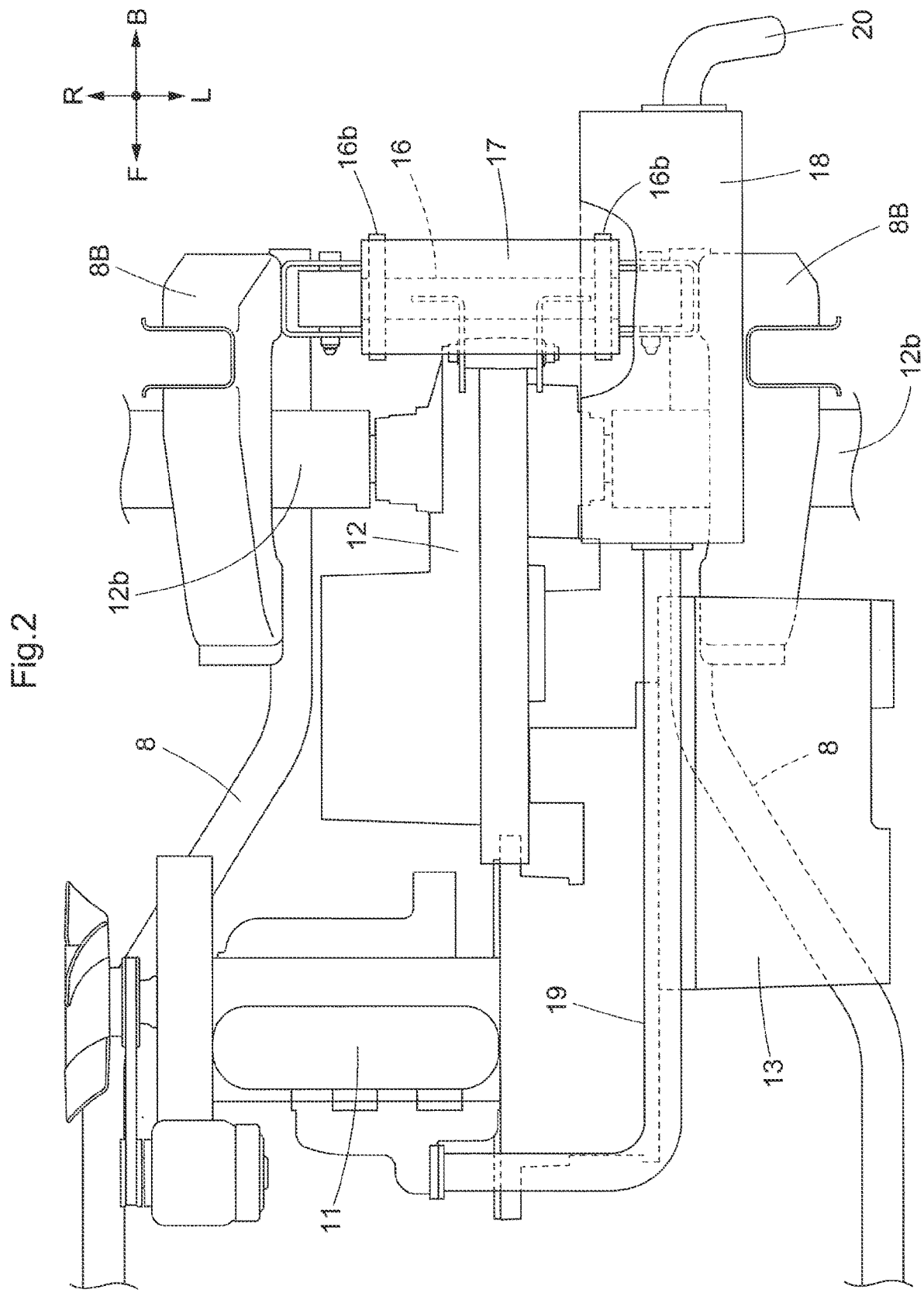
FIG. 2 is a main-part plane view showing an engine, a transmission device, a storage tank, and an exhaust muffler of the multipurpose vehicle.
Figure 3:
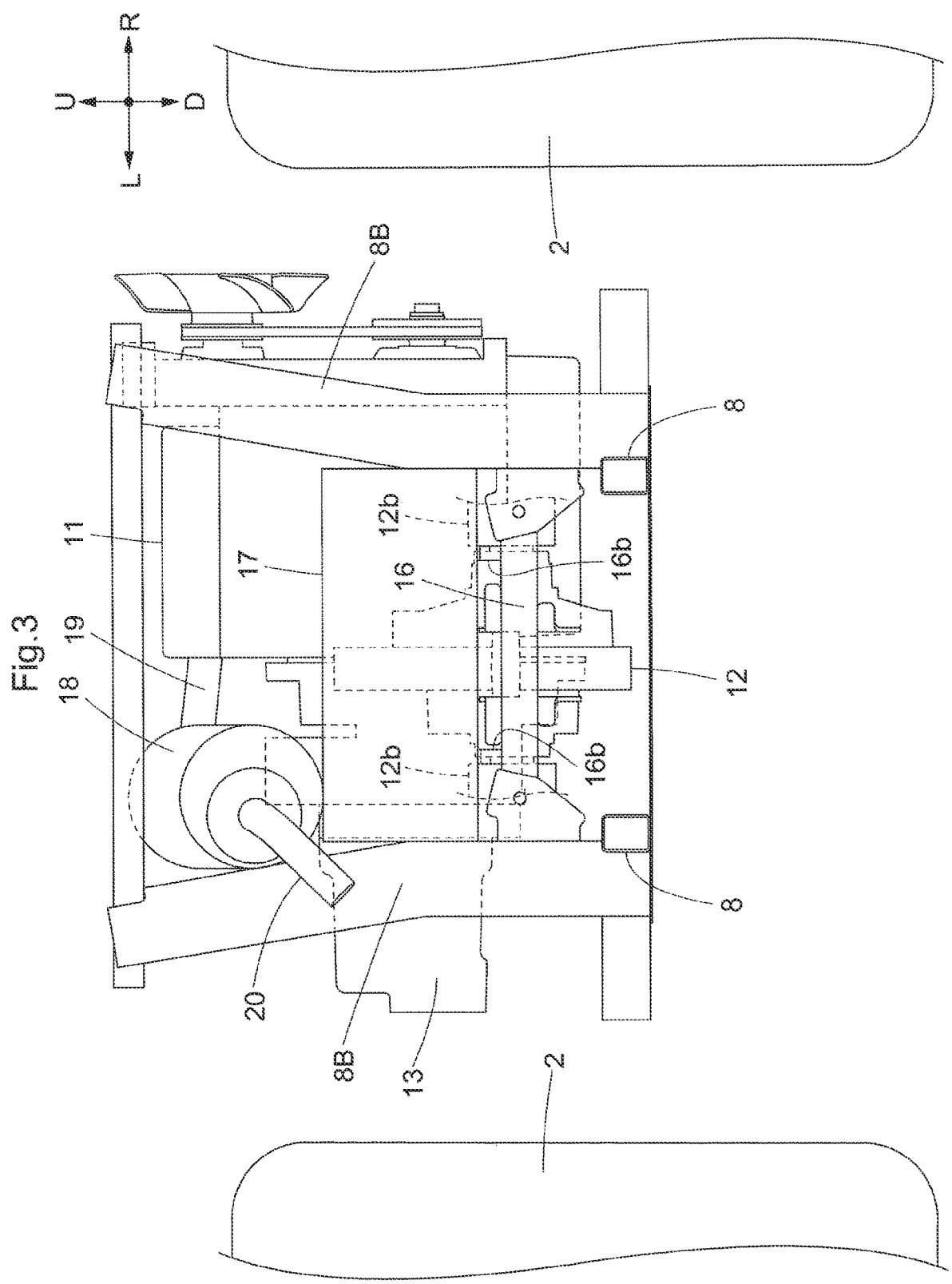
FIG. 3 is a rear view showing a rear portion of the multipurpose vehicle.

In the followings, an embodiment as an example of this invention will be described based on FIGs. In the following description below, with regard to the traveling vehicle body of the multipurpose vehicle, the direction of arrow F shown in FIGS. 1 and 2 is defined as "front side of the vehicle body", the direction of arrow B is defined as "rear side of the vehicle body", the direction of arrow U shown in FIG. 1 is defined as "upper side of the vehicle body", the direction of arrow D is defined as "lower side of the vehicle body", the direction of L shown in FIG. 2 is defined as "left side of the vehicle body", and the direction of R is defined as "right side of the vehicle body".

[Overall Configuration of Multi-Purpose Vehicle]

As shown in FIG. 1, the multipurpose vehicle has a traveling vehicle body 3. In the traveling vehicle body 3, a pair of left and right front wheels 1 are steerably and drivably provided, and a pair of left and right rear wheels 2 are drivably provided. The pair of left and right front wheels 1 and the left and right pair of rear wheels 2 are the "traveling device" of the present invention. A driving section 4 is formed at the middle portion of the traveling vehicle body 3 in the front-rear direction. The driving section 4 is provided with a driver's seat 5 and a steering wheel 6 for steerably operating the front wheels 1. A cargo bed 7 is provided at a rear portion of the traveling vehicle body 3, and the cargo bed 7 is supported by a vehicle body frame 8. The vehicle body frame 8 is provided in a pair on left and right sides of the vehicle body, and extends in the front-rear direction of the vehicle body.

As shown in FIGS. 1 and 2, an engine 11, a traveling transmission device 12, and a stepless speed-changing device 13 are provided below the cargo bed 7. The engine 11 is provided at a front portion of a lower region of the cargo bed 7. In this embodiment, the engine 11 is a diesel engine, but may be a gasoline engine. An exhaust muffler 18 for the engine 11 is also provided. The traveling transmission device 12 is provided at the rear side of the vehicle body relative to the engine 11. The stepless speed-changing device 13 is provided on the left side of the vehicle body relative to the engine 11 and the traveling transmission device 12. In this embodiment, the stepless speed-changing device 13 is a hydraulic static transmission (HST) device (a hydrostatic stepless speed-changing device) and transmits driving force of the engine 11 to a pair of left and right front wheels 1 and a pair of left and right rear wheels 2, with the work oil. The stepless speed-changing device 13 is the "power transmission device" of the present invention. The work oil includes a hydraulic oil, for example.

The rear wheel output section 12b is provided on both lateral sides at a rear end portion of the traveling transmission device 12, and driving force of the engine 11 is outputted from the rear wheel output section 12b to the rear wheels 2. Further, a front wheel output shaft (not shown) is provided on a lateral side of a lower portion of the traveling transmission 12, and driving force of the engine 11 is outputted from the front wheel output shaft to the front wheel 1. Specifically, driving force of the engine 11 is outputted to the front wheels 1 and rear wheels 2 through speed-changing by the traveling transmission device 12 and the stepless speed-changing device 13.

At a front portion of the traveling vehicle body 3, there is provided a hood 14 that can be opened and closed, and a cooling device 15 for cooling the engine 11 and the like are disposed in a space formed in the hood 14. The cooling device 15 is a so-called radiator.

A pair of left and right vertical frames 8B which extends vertically is formed at a rear end portion of the vehicle body frame 8. A support bracket portion 16 is provided between the pair of left and right vertical frames 8B, and a storage tank 17 is supported in the support bracket portion 16. The support bracket portion 16 is the "support portion" of the present invention. The support bracket portion 16 is horizontally laid over the pair of left and right vertical frames 8B. A pair of left and right support members 16b are formed in the support bracket portion 16, and the pair of left and right support members 16B extend in the front-rear direction. The storage tank 17 is supported by the support members 16b of the support bracket portion 16 in a state in which the longitudinal direction of the storage tank 17 is along the lateral direction of the vehicle body and a central region in the longitudinal direction of the storage tank 17 is located in a central region of the vehicle body frame 8 in the lateral direction of the vehicle body. The storage tank 17 is the "storage portion" of the present invention.

As shown in FIG. 2, the exhaust muffler 18 is provided between the left and right pair of vehicle body frames 8, at a position rearward of the engine 11 and closer to the vehicle body frame 8 on the left side of the vehicle body. The front-rear direction of the exhaust muffler 18 coincides with the front-rear direction of the traveling vehicle body 3. The exhaust muffler 18 is disposed on a lateral side of the vehicle body of the engine 11 in a plane view, and on the side where the engine 11 is located relative to the storage tank 17. An intake portion at a front portion of the exhaust muffler 18 and an exhaust portion at a front side of an upper portion of the engine 11 are communicatively connected to each other by a connecting pipe 19. A discharge port 20 is provided in an exhaust path on a rear side relative to the exhaust muffler 18, and the discharge port 20 discharges exhaust gas from the engine 11 outside. The discharge port 20 is located in an upper region of the storage tank 17.

[Cooling Mechanism of Work Oil]

Figure 4:
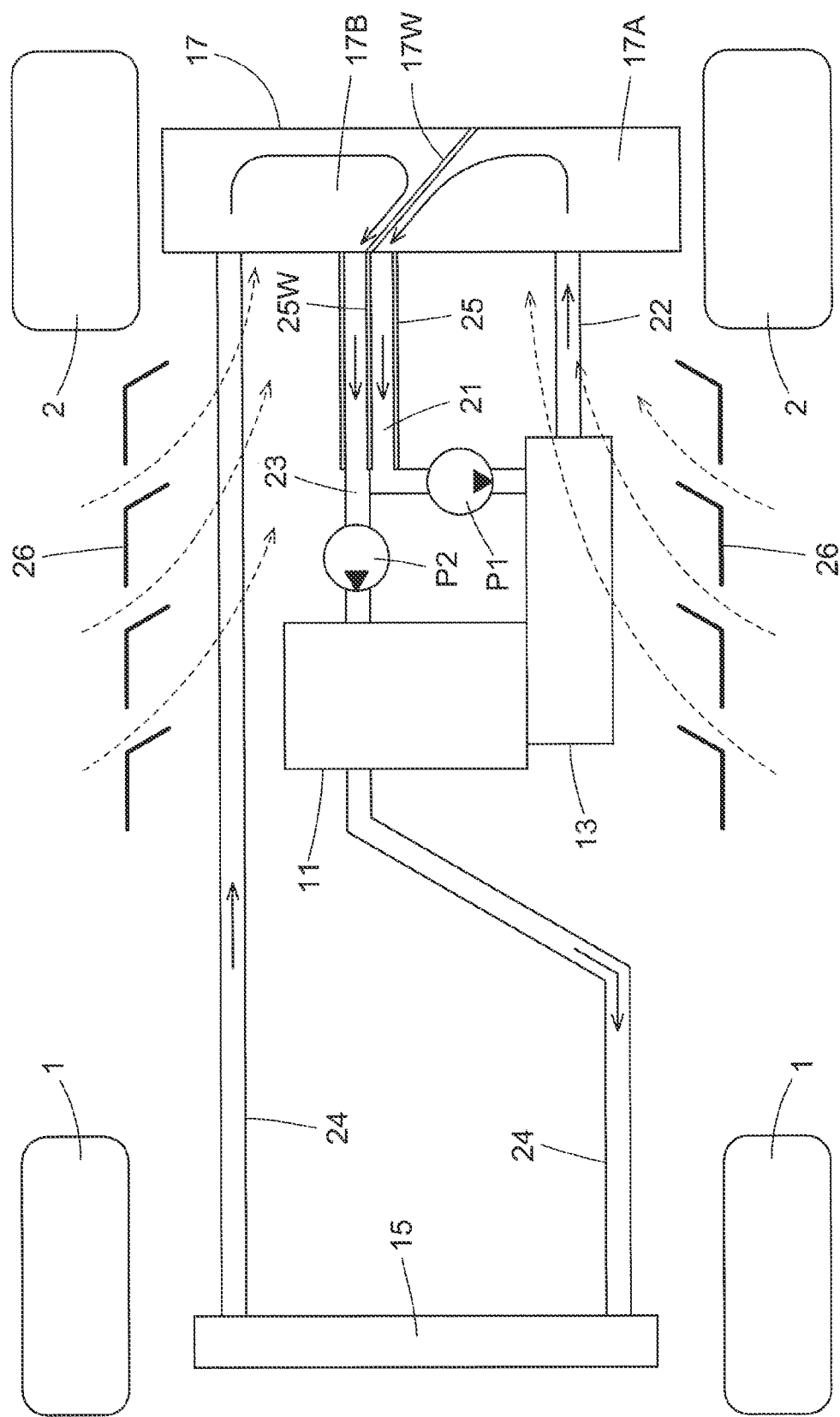
FIG. 4 is a schematic view showing a hydraulic circuit for a work oil and a circulation circuit for a cooling fluid.
Figure 5:
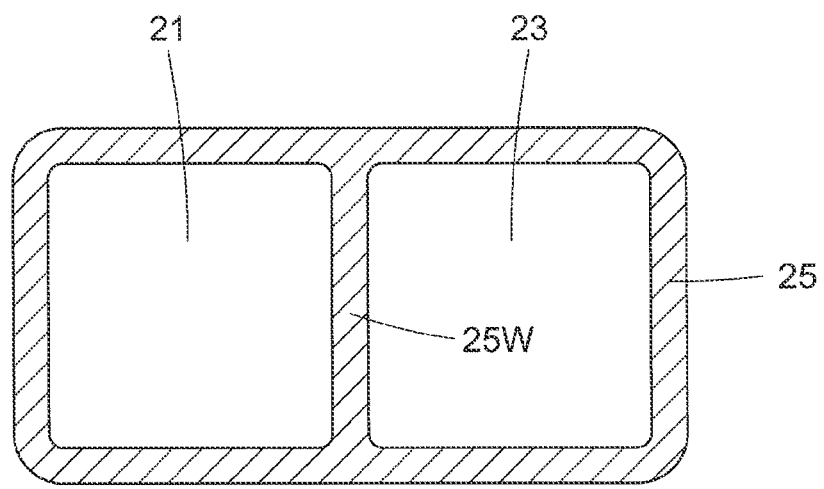
FIG. 5 is a cross-sectional view of a supply tube.

As shown in FIG. 4, the storage tank 17 is formed in a two-layer system so as to have two internal spaces. The two internal spaces in the storage tank 17 are partitioned by a partition wall 17W (which is the "first partition wall" of the present invention). As the two internal spaces, a work oil storage space 17A and a cooling fluid storage space 17B are formed inside the storage tank 17. The work oil storage space 17A stores the work oil of the stepless speed-changing device 13. The cooling fluid storage space 17B stores the cooling fluid for cooling the engine 11. The work oil storage space 17A is the "first storage space" of the present invention, and the cooling fluid storage space 17B is the "second storage space" of the present invention.

The work oil storage space 17A and the cooling fluid storage space 17B are adjacent to each other in a state where the partition wall 17W is interposed between the work oil storage space 17A and the cooling fluid storage space 17B. The partition wall 17W is constituted of stainless steel material. Therefore, heat exchange is promoted between the work oil stored in the work oil storage space 17A and the cooling fluid stored in the cooling fluid storage space 17B. It is desirable that the partition wall 17W be constituted of a material having high thermal conductivity.

FIG. 4 shows a circuit diagram of a flow path of the work oil of the stepless speed-changing device 13 and a flow path of the cooling fluid for cooling the engine 11. The work oil is supplied to a circulation oil path of the stepless speed-changing device 13. The storage tank 17 and the stepless speed-changing device 13 are connected by a supply oil path 21 and an oil returning path 22. The supply oil path 21 is a "first supply pipeline" of the present application. A first pump P1 is provided in the middle of the supply oil path 21, and the first pump P1 pumps the work oil from the storage tank 17 to the stepless speed-changing device 13. The first pump P1 is driven by, for example, the engine 11 or a motor. The work oil used for operation of the stepless speed-changing device 13 (including the work oil leaking from the circulating oil path of the stepless speed-changing device 13) is returned to the storage tank 17 via the oil returning path 22.

The storage tank 17 and the engine 11 are connected by a supply fluid path 23 and a fluid returning path 24. The supply fluid path 23 is a "second supply pipeline" of the present invention. A second pump P2 is provided in the middle of the supply fluid path 23, and the second pump P2 pumps the cooling fluid from the storage tank 17 to the engine 11. The second pump P2 is a so-called water pump and is driven by, for example, the engine 11 or a motor. The cooling fluid used to cool the engine 11 is returned to the storage tank 17 via the fluid returning path 24. A cooling device 15 is provided in the middle of the fluid returning path 24, and the cooling fluid heated by cooling of the engine 11 is cooled by the cooling device 15.

Of each of the supply oil path 21 and the supply fluid path 23, mid-sections extending from the storage tank 17 to a side where the engine 11 is located and to a side where the stepless speed-changing device 13 is located are incorporated into the supply pipe 25. The supply pipe 25 has two pipes inside, and the two pipes are partitioned from each other by a partition wall 25W. The partition wall 25W is a "second partition wall" of the present invention. The supply oil path 21 and the supply fluid path 23 are adjacent to each other in a state where the partition wall 25W is interposed between the supply oil path 21 and the supply fluid path 23. Therefore, heat exchange is promoted between the work oil flowing in the supply oil path 21 and the cooling fluid flowing in the supply fluid path 23. The partition wall 25W is constituted of stainless steel material. It is desirable that the partition wall 25W be a material having high thermal conductivity.

In the stepless speed-changing device 13 which is a hydraulic static transmission (HST) device, the work oil is generally used in operation of the stepless speed-changing device 13 at an appropriate viscosity to enhance a shifting performance. A viscosity of the work oil varies with temperature. Therefore, it is desirable that a temperature of the work oil be within a certain range when the work oil is used in operation of the stepless speed-changing device 13.

In a cold start state, a temperature of the work oil is lower than the optimum temperature and a viscosity of the fluid is high. For this reason, a warm-up operation of the stepless speed-changing device 13 is generally performed with actual vehicle driving, and the temperature of the work oil rises while the stepless speed-changing device 13 operates at a low load in actual vehicle driving. However, in cold regions and low temperature environments, it takes time for the temperature of the work oil to rise, and the warm-up operation of the stepless speed-changing device 13 tends to be prolonged. For this reason, it is desirable that the temperature of the work oil rises to the optimum temperature as quickly as possible from the cold start state.

When the engine 11 is started from the cold start state, the temperature of the cooling fluid rises before the temperature of the work oil because the cooling fluid is used to cool the engine 11 while constantly circulating through the supply fluid path 23 and the fluid returning path 24. At this time, the temperature of the cooling fluid returned from the fluid returning path 24 to the cooling fluid storage space 17B is higher than that of the work oil, and heat is conducted from this cooling fluid to the work oil in the work oil storage space 17A. That is, heat exchange takes place between the cooling fluid and the work oil through the partition wall 17W, and the temperature rise of the work oil is promoted. In addition, when the cooling fluid which circulates through the supply fluid path 23 and the fluid returning path 24 flows through the supply fluid path 23, the cooling fluid flows through the supply fluid path 23 inside the supply pipe 25. Therefore, heat exchange takes place between the work oil in the supply fluid path 21 and the cooling fluid in the supply fluid path 23 through the partition wall 25W, and the temperature rise of the work oil is promoted. As a result, the temperature of the work oil rises faster from the cold start state compared to a configuration in which no heat exchange takes place between the cooling fluid and the work oil.

In a high temperature environment, or when the stepless speed-changing device 13 operates under a high load, the temperature of the work oil tends to rise higher than the optimum temperature. On the other hand, even if the temperature of the cooling fluid is lower than the optimum temperature of the work oil, no particular problem occurs. For this reason, in this embodiment, the cooling fluid is used also to cool the work oil in states other than the cold start state.

In this embodiment, the cooling device 15 cools the cooling fluid so that the temperature of the cooling fluid is equal to or slightly lower than the optimum temperature of the work oil. When the temperature of the work oil becomes higher than that of the cooling fluid, heat is conducted from the work oil in the work oil storage space 17A to the cooling fluid in the cooling fluid storage space 17B. That is, when the temperature of the work oil becomes higher than that of the cooling fluid, heat exchange takes place between the cooling fluid in the cooling fluid storage space 17B and the work oil in the work oil storage space 17A via the partition wall 17W, and cooling of the work oil is promoted. Also, when the work oil flows through the supply oil path 21 inside the supply tube 25 and the cooling fluid flows through the supply fluid path 23 inside the supply tube 25, heat exchange takes place between the work oil in the supply oil path 21 and the cooling fluid in the supply fluid path 23 via the partition wall 25W, and cooling of the work oil is promoted.

Since the cooling fluid receives heat from the work oil before the cooling fluid passes through the engine 11, the cooling fluid tends to have a high temperature as compared with a configuration in which heat exchange between the work oil and the cooling fluid does not take place. For this reason, a cooling capacity of the cooling device 15 needs to be set larger than that of the configuration in which the heat exchange between the work oil and the cooling fluid does not take place. That is, the cooling device 15 indirectly cools the work oil by cooling the cooling fluid that has received heat from the work oil. Nevertheless, in this embodiment, it is not necessary to provide a dedicated oil cooler for the work oil. Compared to a configuration in which a dedicated oil cooler is provided in the hydraulic circuit of the work oil, the overall cooling configuration of the cooling fluid and the work oil together is simplified and space-saving.

In a configuration in which a dedicated oil cooler for the work oil is provided, flow path resistance is generated when the work oil flows through the oil cooler, and this flow path resistance acts as back pressure on the stepless speed-changing device 13, which may be a factor that reduces an operating efficiency of the continuously variable transmission 13. In other words, if the oil cooler is provided in the hydraulic circuit of the work oil, the operating efficiency of the stepless speed-changing device 13 is reduced by an amount of the pressure loss when the work oil flows through the oil cooler. In this embodiment, there is no dedicated oil cooler in the hydraulic circuit of the work oil, and the work oil is cooled by the cooling fluid. Therefore, the temperature of the work oil used for operation of the stepless speed-changing device 13 is easily maintained at the optimum temperature without a dedicated oil cooler, and the operating efficiency (speed-changing performance) of the stepless speed-changing device 13 is enhanced.

The partition wall 17W is provided in the storage tank 17 in a state of being inclined relative to the vertical direction and the horizontal direction. Therefore, compared to a configuration in which the partition wall 17W extends in the vertical direction, the area of the partition wall 17W is larger, which further promotes heat exchange between the cooling fluid in the cooling fluid storage space 17B and the work oil in the work oil storage space 17A. In addition, the cooling fluid and work oil convect inside the storage space 17. Therefore, it is conceivable that the temperature of the cooling fluid may differ between an upper region and a lower region of the cooling fluid storage space 17B, and that the temperature of the work oil may differ between an upper region and a lower region of the work oil storage space 17A. Even in such a case, heat exchange between the cooling fluid in the cooling fluid storage space 17B and the work oil in the work oil storage space 17A is promoted evenly over upper and lower areas of the storage tank 17 because the partition wall 17W is inclined relative to the horizontal direction. As a result, temperature rise of the work oil is further promoted in the cold start state, and cooling of the work oil is further promoted in states other than the cold start state.

A guide plate 26 is provided on the lateral outer portion of the vehicle body of the traveling vehicle body 3, and airflow from a front side to a lateral outer side of the vehicle body for the traveling vehicle body 3, that is, a traveling wind, is guided to the lateral inner side of the vehicle body by the guide plate 26. That is, at the lateral outer side of the vehicle body, there is provided the guide plate 26 which can guide the airflow from the front side to the lateral inner side of the vehicle body. The guide plate 26 is the "guide part" of the present invention. The guide plate 26 is disposed at the front side of the vehicle body and on the lateral outer side of the vehicle body relative to the storage tank 17. The storage tank 17 receives the traveling wind guided to the lateral inner side of the vehicle body by the guide plate 26, and the storage tank 17 is cooled by the traveling wind.

[Configuration of Support Bracket Portion]

As described above, the support bracket portion 16 is formed at the rear end portion of the vehicle body frame 8. In the embodiment described above, the support bracket portion 16 supports a storage tank 17. As shown in FIGS. 6 and 7, the support bracket portion 16 is configured to be able to support the exhaust muffler 18 instead of the storage tank 17. As shown in FIGS. 6 and 7, a belt-type stepless speed-changing device 30 is provided in the traveling vehicle body 3 instead of the continuously variable speed-changing device 13. A lubricating oil is used for the belt-type stepless speed-changing device 30, and the lubricating oil is stored inside the casing of the belt-type stepless speed-changing device 30. Therefore, in a configuration in which the belt-type stepless speed-changing device 30 is adopted for transmitting driving force of the engine 11, the storage tank 17 having the work oil storage space 17A for storing the work oil is not required. In this case, the exhaust muffler 18 is supported by the support bracket portion 16, and the longitudinal direction of the exhaust muffler 18 is along the lateral direction of the machine body. The exhaust muffler 18 is supported on the support bracket portion 16 in a state where the central region in the longitudinal direction of the exhaust muffler 18 is located in the central region of the vehicle body frame 8 in the lateral direction of the vehicle body.

In this way, the support bracket portion 16 supports either the exhaust muffler 18 or the storage tank 17. The support bracket portion 16 has a shape compatible with the exhaust muffler 18 and the storage tank 17 so as to be able to support any of the exhaust muffler 18 and the storage tank 17. The exhaust muffler 18 and the storage tank 17 are supported by the support bracket portion 16 in a state where the central area in the longitudinal direction is located in the central area of the vehicle body frame 8 in the lateral direction of the vehicle body at the time of being supported by the support bracket portion 16. Although the weight of the storage tank 17 tends to be heavy, the configuration of this embodiment facilitates equal weight balance in the left-right direction of the traveling vehicle body 3, whether the storage tank 17 is necessary or not. In addition, the exhaust muffler 18 and the storage tank 17 are supported by the support bracket portion 16 in a state in which the longitudinal direction is along the lateral direction of the vehicle body at the time of being supported by the support bracket portion 16. As a result, the exhaust muffler 18 or the storage tank 17 in a state of being supported by the support bracket portion 16 becomes less likely to protrude rearward relative to the rear end portion of the vehicle body frame 8.

As shown in FIG. 6, an exhaust gas purification device 31 which is an exhaust gas purification device is provided on the left side of the vehicle body of the engine 11. The exhaust gas purification device 31 is provided in the exhaust path between the engine 11 and the exhaust muffler 18, and is, for example, a three-way catalyst or a diesel particulate filter (DPF). Each of the exhaust gas purification device 31 and the exhaust muffler 18 are configured as separate bodies, and the exhaust gas purification device 31 is disposed on the side where the engine 11 is disposed relative to the exhaust muffler 18. By configuring the exhaust gas purification device 31 and the exhaust muffler 18 as separate bodies, the overall size of the combination of the exhaust gas purification device 31 and the exhaust muffler 18 becomes compact.

The exhaust muffler 18 is supported by the support bracket portion 16 at the rear end portion of the vehicle body frame 8, and the support bracket portion 16 is located at the rear end portion of the vehicle body frame 8. With this configuration, a wider space on the left side of the engine 11 is secured as compared with a configuration in which the exhaust muffler 18 is disposed on the left side of the engine 11, and the exhaust gas purification device 31 is easily disposed in this space. This configuration allows a larger space to be secured on the left side of the engine 11 compared to the configuration where the exhaust muffler 18 is located on the left side of the engine 11, and the exhaust gas purification device 31 can be easily disposed in this space. Although the temperature of the exhaust gas purification device 31 becomes generally high, this configuration in which an arrangement space of the exhaust gas purification device 31 is widely secured makes it possible to simplify the heat countermeasures around the exhaust gas purification device 31.

Other Embodiments

The present invention is not limited to the configuration exemplified in the above-described embodiments, and another representative embodiment of the present invention is illustrated below.

(1) In the above embodiment, the front wheels 1 and the rear wheels 2 are shown as the traveling device. For example, the traveling device may be a crawler type device.

(2) In the above-described embodiment, the supply oil path 21 (the first supply pipeline) and the supply liquid path 23 (the second supply pipeline) are each incorporated into the supply pipe 25, and the partition wall 25W (the second partition wall) is interposed between the supply oil path 21 and the supply liquid path 23, but the present invention is not limited to this embodiment. For example, the supply pipe 25 and the partition wall 25W may not be provided, and heat exchange may not take place between the work oil in the supply oil path 21 and the cooling fluid in the supply liquid path 23.

(3) In the above-described embodiment, the partition wall 17W is constituted of a stainless steel member, but the present invention is not limited to this embodiment. For example, the partition wall 17W may be a metal member with an anti-corrosion treatment (anti-corrosion coating) instead of a stainless steel member. Further, the partition wall 17W is provided in the storage tank 17 in a state of being inclined relative to the vertical direction and the horizontal direction, but the present invention is not limited to this embodiment. For example, the partition wall 17W may be a flat body along the vertical direction or a flat body along the horizontal direction. Further, the partition wall 17W does not have to be a flat body, and may be curved inside the storage tank 17. In addition, the partition wall 17W may be provided with fins for heat exchange. Similarly, the partition wall 25W may be provided with fins for heat exchange.

(4) In the embodiment described above, only the stepless speed-changing device 13 is present as a hydraulic machine in the hydraulic circuit of the work oil, but the present invention is not limited to this embodiment. For example, in addition to (or in place of) the stepless speed-changing device 13, power steering, for example, may be present in the hydraulic circuit of the work oil.

(5) In the embodiment described above, the guide plate 26 (guide portion) is provided on the lateral outer portion of the traveling vehicle body 3, but the guide plate 26 may not be provided.

(6) The cooling device 15 may be a water-cooled type or an air-cooled type.

(7) In the embodiment described above, the storage tank 17 is formed in a two-layer system so as to have two internal spaces, but the storage tank 17 may be configured to have three or more internal spaces.

(8) In the embodiment described above, the support bracket portion 16 as a support portion is provided at the rear end portion of the vehicle body frame 8, but the support bracket portion 16 may also be provided at a front portion or front/rear central portion of the vehicle body frame 8.

(9) In the embodiment described above, when the storage tank 17 is supported by the support bracket portion 16, the discharge port 20 is located in the upper region of the storage tank 17, but the discharge port 20 may be located in the lower region of the storage tank 17. Further, the discharge port 20 may also be located in a right region or a left region of the storage tank 17.

(10) In the embodiment described above, a multipurpose vehicle is shown as a work vehicle, but the work vehicle may be a riding lawn mower, may be an agricultural machine such as a tractor, may be a construction machine such as a wheel loader, and may be a snowmobile, a snowplow, or the like.

The configurations disclosed in the embodiments described above (including other embodiments, the same shall apply hereinafter) can be applied in combination with the configurations disclosed in other embodiments as long as there is no contradiction. In addition, the embodiments disclosed herein are exemplary, and the embodiments of the present invention are not limited thereto, and may be modified as appropriate within the scope not departing from the purpose of the present invention.

What is claimed is:

1. A work vehicle comprising:
   an engine;
   a traveling device capable of traveling on the ground;
   a power transmission device that transmits driving power of the engine to the traveling device with a work oil;
   a cooling device for cooling the engine with a cooling fluid;
   a storage unit having a first storage space for storing the work oil and a second storage space for storing the cooling fluid and;
   a supply pipe comprising a supply oil path for the work oil extending from the first storage space and a supply fluid path for the cooling fluid extending from the second storage space,
   wherein the first storage space is directly adjacent the second storage space, and
   wherein the supply oil path is directly adjacent the supply fluid path within the supply pipe.

2. The work vehicle according to claim 1, further comprising:
   a first partition wall provided in the storage unit and partitioning between the first storage space and the second storage space.

3. The work vehicle according to claim 2, wherein the first partition wall is a stainless steel member.

4. The work vehicle according to claim 1, further comprising:
a second partition wall provided in the supply pipe and partitioning between the supply oil path and the supply fluid path.

5. The work vehicle according to claim 4, wherein the second partition wall is a stainless steel member.

6. A work vehicle comprising:
an engine;
a traveling device capable of traveling on the ground;
a power transmission device that transmits driving power of the engine to the traveling device with a work oil;
a cooling device for cooling the engine with a cooling fluid;
a storage unit having a first storage space for storing the work oil and a second storage space for storing the cooling fluid; and
a supply pipe that supplies the work oil from the storage unit to the power transmission device and supplies the cooling fluid from the storage unit to the engine,
wherein a second partition wall is provided in a pipeline of the supply pipe to divide the pipeline of the supply pipe into a plurality of pipelines, and a first supply pipeline connecting between the first storage space and the power transmission device, and a second supply pipeline connecting between the second storage space and the engine are formed by the second partition wall.

7. A work vehicle comprising:
an engine;
a traveling device capable of traveling on the ground;
a power transmission device that transmits driving power of the engine to the traveling device with a work oil;
a cooling device for cooling the engine with a cooling fluid;
a storage unit having a first storage space for storing the work oil and a second storage space for storing the cooling fluid; and
a guide part provided on a lateral outer side of a vehicle body and configured to guide airflow from a front side to a lateral inner side of the vehicle body,
wherein the guide part is disposed at a front side of the vehicle body and at the lateral outer side of the vehicle body relative to the storage unit.

8. A work vehicle, comprising:
a vehicle body frame;
a traveling device capable of traveling on the ground;
an engine supported by the vehicle body frame;
an exhaust muffler connected to the engine; and
a power transmission device that transmits driving power of the engine to the traveling device,
wherein the vehicle body frame is provided with a support portion that supports either the exhaust muffler or a storage unit that stores a work oil of the power transmission device,
wherein the support portion has a shape compatible with the exhaust muffler and the storage unit so as to be able to support the exhaust muffler or the storage unit,
wherein the exhaust muffler and the support portion are overlapped in a plan view, the exhaust muffler being disposed over the support portion, when the exhaust muffler is supported by the support portion, and
wherein the storage unit and the support portion are overlapped in a plan view, the storage unit being disposed over the support portion, when the storage unit is supported by the support portion.

9. The work vehicle according to claim 8, wherein one of the exhaust muffler and the storage unit is supported by the support portion in a state where a central region of the one thereof in a longitudinal direction is located in a central region of the vehicle body frame in a lateral direction of the vehicle body when supported by the support portion.

10. The work vehicle according to claim 8, wherein the support portion is located at a rear end portion of the vehicle body frame; and
wherein one of the exhaust muffler and the storage unit is supported by the support portion in a state in which the longitudinal direction is along the lateral direction of the vehicle body when supported by the support portion.

11. The work vehicle according to claim 8, wherein the support portion has a pair of left and right support members extending rearward, and one of the exhaust muffler and the storage unit is supported by the pair of left and right support members.

12. A work vehicle comprising:
a vehicle body frame;
a traveling device capable of traveling on the ground;
an engine supported by the vehicle body frame;
an exhaust muffler connected to the engine;
a power transmission device that transmits driving power of the engine to the traveling device; and
an exhaust gas purification device provided in an exhaust path between the engine and the exhaust muffler;
wherein the vehicle body frame is provided with a support portion that supports either the exhaust muffler or a storage unit that stores a work oil of the power transmission device,
wherein the support portion has a shape compatible with the exhaust muffler and the storage unit so as to be able to support the exhaust muffler or the storage unit,
wherein the exhaust muffler is supported by the support portion, and
wherein the exhaust gas purification device is disposed on a side where the engine is located, relative to the exhaust muffler.

13. A work vehicle comprising:
a vehicle body frame;
a traveling device capable of traveling on the ground;
an engine supported by the vehicle body frame;
an exhaust muffler connected to the engine; and
a power transmission device that transmits driving power of the engine to the traveling device,
wherein the vehicle body frame is provided with a support portion that supports either the exhaust muffler or a storage unit that stores a work oil of the power transmission device,
wherein the support portion has a shape compatible with exhaust muffler and the storage unit so as to be able to support the exhaust muffler or the storage unit,
wherein the storage unit is supported by the support section, and
wherein the exhaust muffler is disposed on a lateral side of the vehicle body of the engine in a plan view and on the side where the engine is located, relative to the storage unit.

14. The work vehicle according to claim 13, wherein a discharge port that exhaust gas from the engine is provided in the exhaust path on a rear side relative to the exhaust muffler; and
wherein the discharge port is located in an upper region of the storage unit.

* * * * *